(12) United States Patent
Kubota et al.

(10) Patent No.: US 6,931,878 B2
(45) Date of Patent: Aug. 23, 2005

(54) ARRANGEMENT OF COOLING APPARATUS

(75) Inventors: Shinya Kubota, Saitama (JP);
Toshiyuki Matsuoka, Saitama (JP);
Yoshinori Mita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 58 days.

(21) Appl. No.: 10/615,514

(22) Filed: Jul. 8, 2003

(65) Prior Publication Data

US 2004/0010357 A1 Jan. 15, 2004

(30) Foreign Application Priority Data

Jul. 9, 2002 (JP) .................................... 2002-199746

(51) Int. Cl.[7] .............................................. F25D 23/12
(52) U.S. Cl. ...................................... 62/259.2; 62/244
(58) Field of Search ............................ 62/259.2, 186, 62/244, 239, 408, 409

(56) References Cited

U.S. PATENT DOCUMENTS 4,252,053 A * 2/1981 Muto et al. ................ 454/137
4,324,286 A * 4/1982 Brett ........................ 165/202
5,937,664 A * 8/1999 Matsuno et al. ........... 62/259.2
6,225,788 B1 * 5/2001 Kouzu et al. ............... 320/150

* cited by examiner

Primary Examiner—Melvin Jones
(74) Attorney, Agent, or Firm—Lahive & Cockfield, LLP; Anthony A. Laurentano, Esq.

(57) ABSTRACT

An arrangement of a cooling apparatus installed in a vehicle for cooling with an air refrigerant an electricity storing apparatus for storing electricity generated in the vehicle, comprises an inlet port, a discharge duct and a fan. The inlet port let in therefrom the air refrigerant to the electricity storing apparatus. The discharge duct is disposed below a floor surface of a trunk of the vehicle for causing the air refrigerant discharged from the electricity storing apparatus to flow therethrough. The fan is situated in the discharge duct for discharging the air refrigerant. The fan is disposed outwardly of an interior material provided on a side of the trunk of the vehicle. The arrangement of a cooling apparatus can prevent the operating noise of a fan from entering a passenger compartment and which can facilitate the installation of luggage in a trunk.

3 Claims, 2 Drawing Sheets

ARRANGEMENT OF COOLING APPARATUS

BACKGROUND OF THE INVENTION

1. Field of the Invention

The present invention relates to an arrangement of a cooling apparatus for cooling with a refrigerant an electricity storing apparatus which is adapted for installation in electric vehicles, hybrid vehicles and fuel cell vehicles and has an electricity storing element such as an electric double layer capacitor and a secondary battery.

2. Description of the Related Art

In electric vehicles, hybrid vehicles and fuel cell vehicles, an electricity storing apparatus and a high-voltage distributor which are inherently provided on these vehicles, are, in many cases, disposed at a front nose part, under a floor of a passenger compartment, on a rear side of a rear seat or in a trunk thereof. In particular, in a case where they are disposed on the rear side of the rear seat, a good space efficiency can be provided and a related-art vehicle body can be used without changing the structure thereof. Furthermore, since the high safety can be ensured at the time of collision, the rear side of the rear seat constitutes one of best locations on the vehicle where the electricity storing apparatus is disposed when the apparatus is installed in the vehicle.

In a case where this electricity storing apparatus is installed in a fuel cell vehicle, the apparatus can store apart of generated electric power which is generated by a fuel cell or through a rotational force of a driving motor. In particular, the electricity storing apparatus is used for storing a surplus generated electric power, for example, which is generated when the speed of the fuel cell vehicle is decreased. For example, the electric power so stored is supplied to the driving motor when accelerating the fuel cell vehicle so as to assist the fuel cell. In addition, this electricity storing apparatus generates the heat through its electrochemical reaction or its electric resistance when electricity is charged and discharged.

Consequently, since a temperature of the electricity storing apparatus is increased while the vehicle is running, it becomes inevitable to cool the same apparatus. Due to this, a fan is disposed for cooling the electricity storing apparatus. However, in a case where the fan is disposed on the rear side of the rear seat, the cooling fan, a duct or the like which constitute a cooling apparatus are disposed adjacent to the electricity storing apparatus, the high-voltage distributor or the like. Further, air within the passenger compartment is drawn in as a refrigerant from an upper portion of the rear seat to the cooling apparatus, and the refrigerant so drawn in cools the electricity storing apparatus and is thereafter discharged.

FIGS. 2A and 2B are schematic views showing an arrangement of a related-art cooling apparatus. FIG. 2A is a perspective view thereof when viewed from a left rear corner of the vehicle. FIG. 2B is a longitudinal sectional view taken along the line B—B in FIG. 2A. As shown in FIGS. 2A, 2B, an electricity storing apparatus 21 is disposed on a rear side of a rear seat 22 of a vehicle 200. An inlet port 23a is provided in an upper portion of the electricity storing apparatus 21. A refrigerant such as air inside a passenger compartment is drawn in from the inlet port 23a through an inlet duct 23 to the electricity storing apparatus 21. Discharge ducts 24 are tightly joined to fans 27. The refrigerant so drawn in cools the electricity storing apparatus 21 and is thereafter discharged by the fans 27 through the discharge ducts 24. Due to this, the fans 27 are disposed within or near the passenger compartment. Note that reference numeral 25 denotes a trunk, reference numeral 26 denotes a floor surface and reference numeral 28 denotes a space below the floor.

In the related-art arrangement where the electricity storing apparatus is disposed on the rear side of the rear seat, however, since the cooling apparatus for cooling the electricity storing apparatus and the high-voltage distributor is situated close to the rear seat, there is caused a problem that the operation noise generated by the fans enters the passenger compartment.

In addition, the fans which generate noise and discharge ports of the refrigerant which constitute outlets of the operation noise so generated are provided on the rear side of the rear seat, and they are in many cases disposed in the vicinity of the electricity storing apparatus and the high-voltage distributor in such a manner as to project into the trunk. Due to this, in the case of a vehicle having a vehicle body configuration in which the trunk is not independent and an opening in a tail gate is wide, there is caused a problem that the effective volume of the trunk becomes small. In addition, there is also caused a problem that an installation of luggage in the trunk, as well as loading and unloading are difficult.

SUMMARY OF THE INVENTION

The invention was made with a view to solving the problems and an object thereof is to provide an arrangement of a cooling apparatus which can prevent the operation noise of the fans entering the passenger compartment to thereby improve the quietness therein and also can increase the effective volume of the trunk to thereby facilitate the installation of luggage in the trunk, as well as loading and unloading.

With a view to solving the problems, according to a first aspect of the invention, there is provided an arrangement of a cooling apparatus installed in a vehicle for cooling an electricity storing apparatus for storing electricity generated within the vehicle, comprising, an inlet port for letting in air refrigerant within a passenger compartment from the inlet port to the electricity storing apparatus, a discharge duct disposed below a floor surface of a trunk of the vehicle for passing therethrough the air refrigerant discharged from the electricity storing apparatus, a discharge port provided in the discharge duct for discharging therefrom the air refrigerant and a fan provided in the discharge duct for causing the air refrigerant to flow, wherein the discharge port and the fan are disposed outwardly of an interior material on a side of the trunk.

According to the first aspect of the invention, the discharge duct having the discharge port from which the air refrigerant discharged from the electricity storing apparatus is discharged is disposed below the floor surface of the trunk of the vehicle. Further, the fan for discharging the air refrigerant is disposed outwardly of the interior material on the side of the trunk. Therefore, the fan can be separated apart from the passenger compartment so as to prevent the operation noise of the fan from entering the passenger compartment, thereby making it possible to improve the quietness in the passenger compartment.

In addition, the discharge duct for discharging the air refrigerant remaining in the electricity storing apparatus is arranged to be laid out below the floor surface of the trunk. Therefore, no protrusion into the trunk is provided, and the effective volume of the trunk is increased, thereby making it possible to facilitate the installation of luggage in the trunk, as well as loading and unloading.

According to a second aspect of the invention, there is provided an arrangement of a cooling apparatus as set forth in the first aspect of the invention, wherein a communication hole for allowing the air refrigerant discharged from the discharge port to flow into the trunk is formed in the interior material, whereby the air refrigerant is allowed to return into the passenger compartment via the trunk.

According to the second aspect of the invention, in addition to the advantage provided by the first aspect of the invention, the air refrigerant discharged by the fan is introduced into the trunk from the communication hole formed in the interior material and is thereafter allowed to flow back into the passenger compartment. Therefore, the noise level can be reduced lower with a noise-level reducing effect provided by the volume of the trunk than when returning the air directly to the passenger compartment.

In addition, since the air within the passenger compartment can be circulated for use as air refrigerant, there is no need to draw in a fresh air from the outside of the vehicle as air refrigerant.

DETAILED DESCRIPTION OF THE INVENTION

Figure 1A:
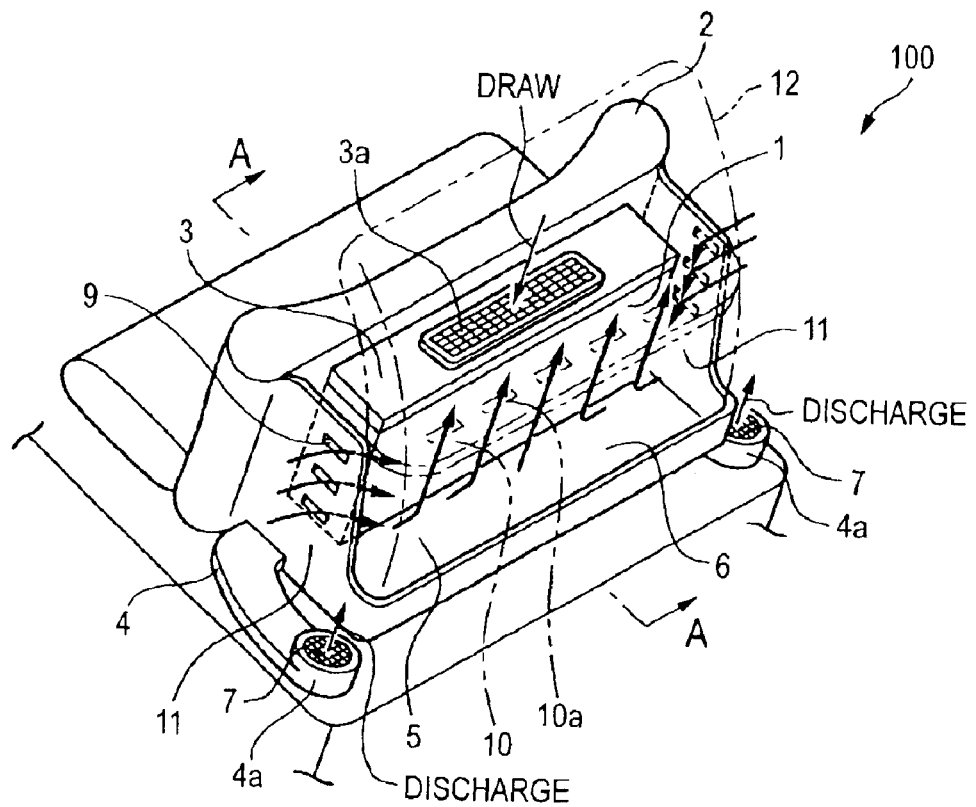
FIG. 1A is a perspective view showing an arrangement of a cooling apparatus according to an embodiment of the present invention as viewed from a left rear corner of the vehicle.
Figure 1B:
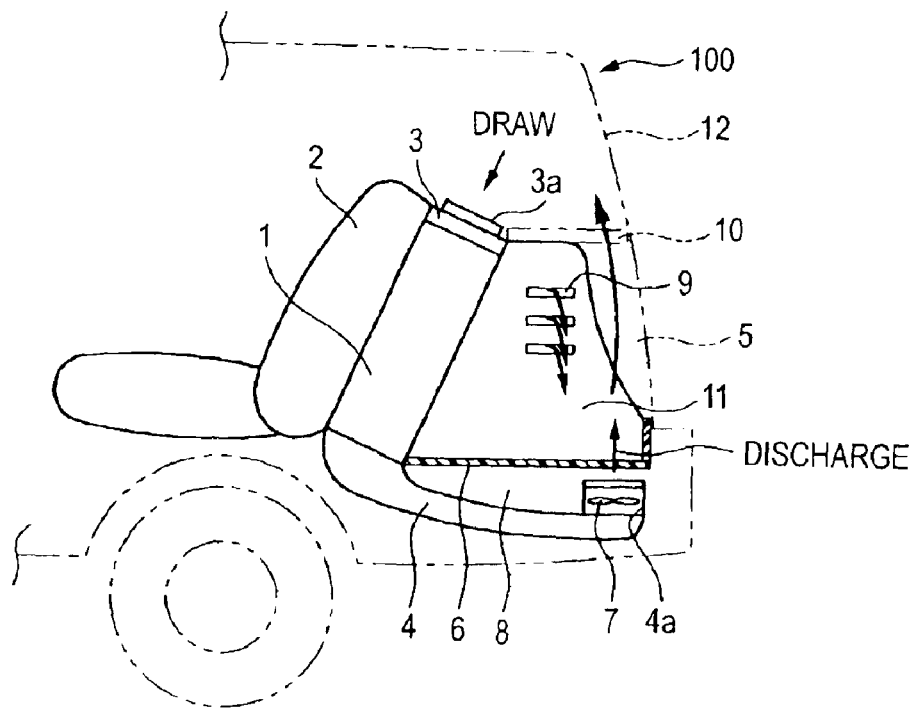
FIG. 1B is a longitudinal sectional view taken along the line A—A in FIG. 1A.
Figure 2A:
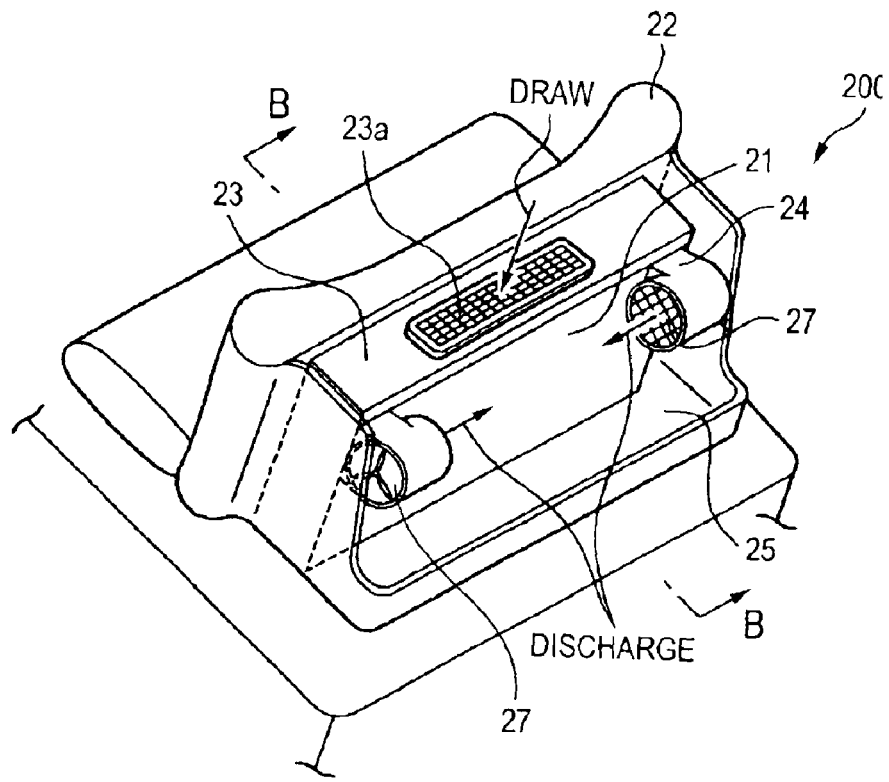
FIG. 2A is a perspective view showing a related-art arrangement of a cooling apparatus as viewed from a left rear corner of the vehicle.
Figure 2B:
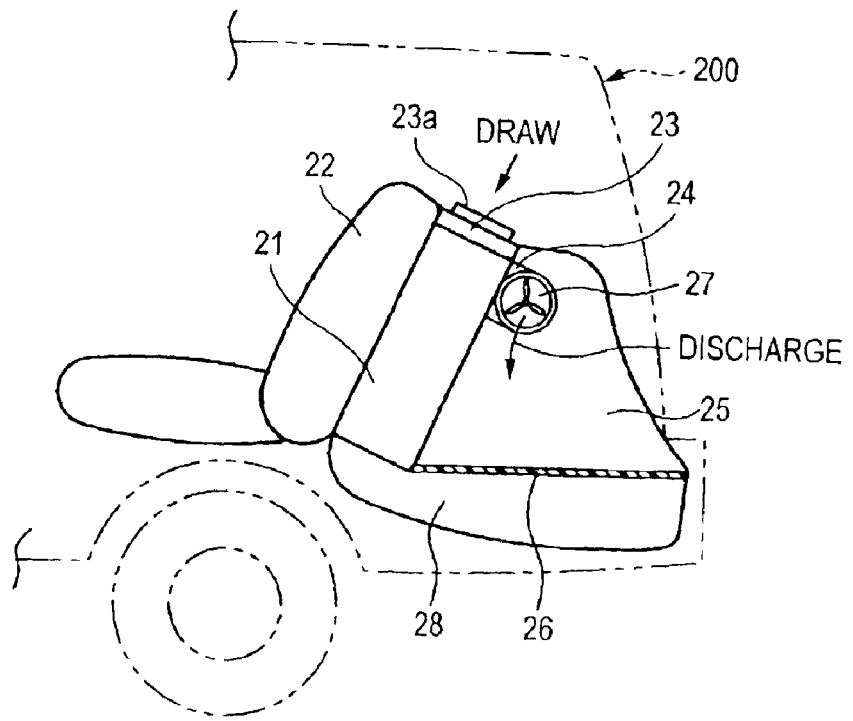
FIG. 2B is a longitudinal sectional view taken along the line B—B in FIG. 2A.

An embodiment of an arrangement of a cooling apparatus according to the invention will be described by reference to the accompanying drawings. FIG. 1A is a perspective view showing an arrangement of a cooling apparatus as viewed from a left rear corner of the vehicle and FIG. 1B shows a longitudinal sectional view taken along the line A—A in FIG. 1A. As shown in FIGS. 1A, 1B, an electricity storing apparatus 1 is disposed on a rear side of a rear seat 2 of a vehicle 100. The electricity storing apparatus 1 has an inlet port 3a at an upper portion thereof and discharge ducts 4 at a lower portion thereof. The inlet port 3a let in air within a passenger compartment as air refrigerant. The discharge duct 4 passes therethrough and discharges the air refrigerant discharged from the electricity storing apparatus 1. In this construction, the air refrigerant is drawn into the electricity storing apparatus 1 from the inlet port 3a disposed near the passenger compartment via an inlet duct 3 by operating a fan 7 provided in the discharge duct 4 so that the air refrigerant cools batteries, not shown, which function as electricity storing elements constituting the electricity storing apparatus 1. The air refrigerant, after having cooled the electricity storing elements, is then discharged to the discharge duct 4 from the interior of the electricity storing apparatus 1. The discharge duct 4 is arranged to be laid out in a space 8 below a floor surface 6 of a trunk 5. A discharge port 4a of the discharge duct 4 and a fan 7 for causing the air refrigerant to flow are disposed in a space situated outwardly of an interior material 11 provided on a side of the trunk 5.

The space where the discharge port 4a of the discharge duct 4 and the fan 7 are provided and which is situated outwardly of the interior material 11 on the side of the trunk 5 constitutes a space which is separated from the trunk 5 by the side interior material 11. Communication holes 9 are formed in the side interior material 11. As will be described later on, a part of the air refrigerant discharged by the fan 7 is allowed to be discharged into the trunk 5 via these communication holes 9. The passenger compartment and the trunk 5 are separated from each other by a rear shelf 10 and a rear window 12. Slits 10a are formed in the rear shelf 10 so as to establish communications between the trunk 5 and the passenger compartment. The slits 10a are provided in close proximity to the rear window 12.

Next, the function of the arrangement of the cooling apparatus constructed as has been described above will be described. As shown in FIGS. 1A, 1B, when activating the fan 7 which is tightly joined to the discharge port 4a of the discharge duct 4 and which functions as a means for causing the air refrigerant to flow, since the air within the electricity storing apparatus 1 is caused to flow toward the fan 7, the air within the passenger compartment is drawn into the interior of the electricity storing apparatus 1 as air refrigerant from the inlet port 3a, which is situated at the upper portion opposite to the discharge duct 4, via the inlet duct 3.

Many batteries which are electricity storing elements are provided in the interior of the electricity storing apparatus 1, and air refrigerant drawn into the inlet duct 3 from the inlet port 3a flows between these batteries to cool them. Then, air refrigerant is discharged temporarily into the space outwardly of the interior material 11 on the side of the trunk 5 via the discharge duct 4 by the fan 7 tightly joined to the discharge port 4a.

The air refrigerant discharged from the discharge port 4a is discharged into the trunk 5 from the communication holes 9 in the interior material 11 on the side of the trunk 5 and is then returned into the passenger compartment through the slits 10a formed in the rear shelf 10. As has been described before, since the slits 10a are formed in close proximity to the rear window 12, the air refrigerant that has passed through the slits 10a is allowed to return into the passenger compartment along a curved surface of the rear window 12.

Thus, since the air refrigerant discharged from the fan 7 is temporarily introduced into the trunk 5, the noise level can be reduced lower by virtue of a noise-reducing effect provided by the volume of the trunk 5 than when returning the air directly into the passenger compartment. In addition, since the air refrigerant can be returned into the passenger compartment along the rear window 12, the air is prevented from being applied directly to passengers in the rear seat, thereby making it possible to preserve the comfortableness of the passengers.

In addition, when the batteries are cooled by the air refrigerant flowing through spaces between the batteries and the temperature of the batteries are thus reduced, the air refrigerant absorbs heat from the batteries and is warmed. In other words, the temperature of the air refrigerant is increased by the heat from the batteries. The air refrigerant whose temperature is increased is then discharged into the passenger compartment. The air as refrigerant discharged into the passenger compartment is then temporarily circulated in the passenger compartment and is cooled by the air conditioner or is mixed with fresh air taken in from the outside, where by the temperature of the air is decreased. The air whose temperature is so decreased is drawn again as air refrigerant into the electricity storing apparatus 1 from the inlet port 3a opened at the upper portion of the electricity storing apparatus 1 via the inlet duct 3 to thereby cool the electricity storing apparatus 1 as has been described above.

Thus, the temperature of the batteries functioning as electricity storing elements provided in the electricity storing apparatus 1 can be maintained at a suitable temperature ranging, for example, from about 40 to 50° C. by circulating the air refrigerant between the electricity storing apparatus 1 and the passenger compartment while controlling the revolution of the fan 7 by using a temperature control means, not shown, thereby making it possible to improve the life of the batteries.

In addition, the fan 7 can be placed away from the passenger compartment, and hence it is possible to prevent the operating noise of the fan 7 from entering the passenger compartment.

Furthermore, the discharge duct 4 for discharging the air refrigerant is disposed below the floor surface 6 of the trunk 5, and the fan 7 is disposed outwardly of the interior material 11 on the side of the trunk 5. Owing to this, for example, in the vehicle 100 having a vehicle body configuration in which no independent trunk 5 is provided and the opening in the tail gate is wide, there is provided no protrusion into the trunk 5 of the vehicle 100. Therefore, a wide space can be ensured in the trunk 5, and furthermore, loading of luggage into the trunk 5 can be improved.

As has been described heretofore, according to the first aspect of the invention, the discharge duct for passing air refrigerant discharged from the electricity storing apparatus therethrough is disposed below the floor surface of the trunk and the fan provided at the discharge port of the discharge duct for discharging air refrigerant is disposed outwardly of the interior material on the side of the trunk. The fan can be separated apart from the passenger compartment and hence it is possible to prevent the operating noise of the fan from entering the passenger compartment, thereby making it possible to improve the quietness in the passenger compartment.

In addition, the installation of luggage in the trunk and loading and unloading thereof can be facilitated by arranging the discharge duct below the floor surface of the trunk of the vehicle.

According to the second aspect of the invention, the noise-level can be reduced lower by virtue of the noise level reducing effect provided by the volume of the trunk than when returning air directly into the passenger compartment.

In addition, since the air within the passenger compartment can be circulated for use as air refrigerant, there is no need to draw in fresh air from the outside of the vehicle as air refrigerant.

What is claimed is:

1. An arrangement of a cooling apparatus installed in a vehicle for cooling an electricity storing apparatus for storing electricity generated within the vehicle, comprising:

an inlet port for letting in air refrigerant within a passenger compartment from the inlet port to the electricity storing apparatus;

a discharge duct disposed below a floor surface of a trunk of the vehicle for passing therethrough the air refrigerant discharged from the electricity storing apparatus, a discharge port provided in the discharge duct for discharging therefrom the air refrigerant; and a fan provided in the discharge duct for causing the air refrigerant to flow;

wherein the discharge port and the fan are disposed outwardly of an interior material on a side of the trunk.

2. An arrangement of a cooling apparatus as set forth in claim 1, wherein a communication hole for allowing air refrigerant discharged from the discharge port to flow into the trunk is formed in the interior material, so that the air refrigerant is allowed to return into the passenger compartment via the trunk.

3. An arrangement of a cooling apparatus installed in a vehicle for cooling an electricity storing apparatus for storing electricity generated within the vehicle, comprising:

an inlet port for letting in air refrigerant within a passenger compartment from the inlet port to the electricity storing apparatus;

a discharge duct disposed below a floor surface of a trunk of the vehicle for passing therethrough the air refrigerant discharged from the electricity storing apparatus;

a discharge port provided in the discharge duct for discharging therefrom the air refrigerant; and a fan provided in the discharge duct for causing the air refrigerant to flow.

* * * * *